(12) United States Patent
Baker et al.

(10) Patent No.: US 8,437,341 B2
(45) Date of Patent: May 7, 2013

(54) CONTACT PRIORITY REORDERING

(75) Inventors: Albert J. Baker, Eatontown, NJ (US);
Eileen P. Rose, Manasquan, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 968 days.

(21) Appl. No.: 11/374,740

(22) Filed: Mar. 14, 2006

(65) Prior Publication Data

US 2007/0217418 A1    Sep. 20, 2007

(51) Int. Cl.
*H04L 12/66* (2006.01)
*H04L 12/56* (2006.01)

(52) U.S. Cl.
USPC ..................... 370/356; 370/395.52

(58) Field of Classification Search ............... 370/392, 370/395.52; 709/228
See application file for complete search history.

(56) References Cited

U.S. PATENT DOCUMENTS

| | | | |
|---|---|---|---|
| 7,162,236 B2* | 1/2007 | Dorenbosch et al. | 455/432.1 |
| 7,313,228 B1* | 12/2007 | Sorice et al. | 379/88.17 |
| 2003/0217174 A1* | 11/2003 | Dorenbosch et al. | 709/237 |
| 2003/0236892 A1* | 12/2003 | Coulombe | 709/228 |
| 2004/0230697 A1* | 11/2004 | Kiss et al. | 709/245 |
| 2005/0044127 A1* | 2/2005 | Jaiswal et al. | 709/200 |
| 2005/0075102 A1* | 4/2005 | Minko | 455/420 |
| 2005/0135335 A1* | 6/2005 | Hession et al. | 370/352 |
| 2005/0216595 A1* | 9/2005 | Miyata et al. | 709/227 |
| 2005/0239498 A1* | 10/2005 | Dorenbosch et al. | 455/552.1 |
| 2006/0167977 A1* | 7/2006 | Wu et al. | 709/203 |
| 2006/0235994 A1* | 10/2006 | Wu | 709/238 |

OTHER PUBLICATIONS

J. Rosenberg, P. Kyzivat, RFC-4596—Guidelines for usage of Session Initiation Protocol (SIP) Caller Preferences Extension—Section 2, Jul. 2006.*

* cited by examiner

*Primary Examiner* — Melanie Jagannnathan

(57) ABSTRACT

A method is disclosed that provides a way to manage the registrations of telecommunications endpoints, and to prioritize those registered endpoints, or "contacts," that belong to a user, without some of the disadvantages in the prior art. The technique of the illustrative embodiment, which is referred to as "contact priority reordering," prioritizes the contacts that are associated with a Session Initiation Protocol (SIP) public address of a user, without having to modify any endpoints. Moreover, the technique is interoperable with any SIP endpoint. The technique can be regarded as a reordering process because it overrides any endpoint ordering that occurs at a registrar server as a consequence of the registrations and re-registrations of the individual endpoints. Advantageously, the technique prioritizes the contacts that are associated with a particular public address without requiring that any changes be made to the registrar server—or to any other SIP servers.

18 Claims, 4 Drawing Sheets

CONTACT PRIORITY REORDERING

FIELD OF THE INVENTION

The present invention relates to telecommunications in general, and, more particularly, to prioritizing a set of contacts that are associated with a Session Initiation Protocol public address of a user.

BACKGROUND OF THE INVENTION

FIG. 1 depicts telecommunications system 100 in the prior art. Telecommunications system 100 comprises telecommunications network 101; telecommunications endpoints 102-1 through 102-M, wherein M is a positive integer; registrar server 103; proxy server 104; and calling endpoint 105, interconnected as shown. Telecommunications system 100 is capable of Session Initiation Protocol-based signaling. Session Initiation Protocol (or "SIP") is a set of standardized communication rules for initiating and maintaining communications for telephony, presence-based systems, instant messaging, and other telecommunications applications.

Telecommunications network 101 is a telecommunications network such as the Internet, the Public Switched Telephone Network (PSTN), and so forth. Network 101 comprises or is connected to one or more transmission-related nodes such as gateways, routers, or switches that are used to direct packets from one or more sources to the correct destinations of those packets. Network 101 is capable of handling SIP-based messages that are transmitted among two or more SIP-capable processing systems.

Each of telecommunications endpoints 102-1 through 102-M, as well as calling endpoint 105, is a SIP-capable device such as an Internet-protocol telephone, a notebook computer, a personal digital assistant (PDA), a tablet computer, and so forth. Each endpoint is capable of originating outgoing calls and receiving incoming calls, in well-known fashion. In addition, each endpoint is capable of one or more communication modes that comprise, but are not limited to voice, video, data, email, instant messaging, and chat.

One issue that exists in telecommunications system 100 has to do with a user having multiple endpoints (as opposed to a single endpoint) that register with registrar server 103. Specifically, when the user has access to routing features that enable the endpoints to be notified in a particular order, the registering of new endpoints or the re-registering of existing endpoints might skew the order in which the endpoints are notified. From a standards perspective, the Session Initiation Protocol does specify a mechanism for the ordering, or prioritization, of endpoints by using a parameter referred to as a "q-value"; the higher the endpoint's q-value, the higher its priority relative to the other endpoints of the same user. In reality, however, the user of multiple endpoints typically has no control over the ordering in which an incoming call is routed to his or her endpoints. In some cases, the q-value of an endpoint is preset by the endpoint's vendor; preset q-values can be a problem when an end user utilizes endpoints from different vendors because each vendor follows its own rules for presetting the q-values. In other cases, the q-value is not preset in an endpoint, and the endpoint registers with some general, default q-value. In those cases, all registered endpoints that use the default queue value essentially have the same incoming call priority. The effects of using multiple endpoints with uncertain q-values can be annoying to their user, create unnecessary message traffic, and waste network resources.

What is needed is a technique to prioritize the telecommunications endpoints that belong to a user, without some of the disadvantages in the prior art.

SUMMARY OF THE INVENTION

The present invention provides a way to manage the registrations of telecommunications endpoints, and to prioritize those registered endpoints, or "contacts," that belong to a user, without some of the disadvantages in the prior art. The technique of the illustrative embodiment, which is referred to as "contact priority reordering," prioritizes the contacts that are associated with a SIP public address of a user, without having to modify any endpoints; moreover, the technique is interoperable with any SIP endpoint. The technique can be regarded as a reordering process because it overrides any endpoint ordering that occurs at a registrar server as a consequence of the registrations and re-registrations of the individual endpoints.

The data-processing system that performs the contact priority reordering of the illustrative embodiment first receives an indication that a telecommunications endpoint has registered with a registrar server, in which the contact endpoint is identified by a contact address. The system then determines the number of contact endpoints that are associated with the public address of the user of the newly-registered endpoint. The system then prioritizes the contacts for the public address of interest, in terms of the order in which those contacts are to be notified of an incoming call made to that public address.

The prioritization is based on one or more conditional business rules, which are themselves based on one or more of the following properties:

i. the calendrical time;
ii. the resource utilization (e.g., processor load, memory use, etc.) of one or more endpoints of the same public address;
iii. the communications capability of one or more endpoints of the same public address;
iv. a higher priority being assigned to voice-capable endpoints than to voice-incapable endpoints;
v. the frequency that each endpoint is used in calls, relative to the other endpoints of the same public address;
vi. the frequency that each endpoint is used specifically to originate a call, relative to the other endpoints of the same public address;
vii. the type of forking to be performed on an incoming call;
viii. the availability of a user; and
ix. the location of a user.

The prioritization is achieved by advantageously re-setting the SIP q-value, as is known in the art, of each endpoint to a value that accounts for the q-values of the other endpoints that are associated with the same public address. The ordering of the q-values reflects the order in which the contacts are to be notified of an incoming call. In some embodiments, the actual q-values are based on the number of contacts that are associated with the public address. The system then transmits the q-values to the registrar server, and the registrar server stores those q-values for the public address of interest. The registrar server then represents the prioritized contacts to a proxy server for the purpose of handling incoming calls.

The technique of the illustrative embodiment addresses the problem of prioritizing the contacts that are associated with a particular public address without requiring that any changes be made to the registrar server—or to any other SIP servers, for that matter. The technique can be applied to a telecommunications network as an adjunct process (i.e., in an overlaid data-processing system) or, alternatively, can be embedded in the registrar server itself. In either case, the technique works with a set of mixed endpoints that are from different manufacturers, without requiring modifications to those endpoints or to the SIP protocol.

The illustrative embodiment of the present invention comprises replacing a first q-value that is stored at a registrar server with a second q-value that is based on at least one conditional rule, wherein the registrar server operates in accordance with the Session Initiation Protocol; wherein the first q-value had been provided by a first telecommunications endpoint that is identified by a first contact address; wherein the second q-value determines the order in which the first telecommunications endpoint receives notification of an incoming call relative to a second telecommunications endpoint that is identified by a second contact address; and wherein the first contact address and the second contact address are associated with a public address.

DETAILED DESCRIPTION

The following terms are defined for use in this Specification, including the appended claims:
  The term "call," and its inflected forms, is defined as a communication of user information between two or more telecommunications terminals. Examples of a call are a voice telephone call (including interactive voice response [IVR] sessions), an emailing, a text-based instant message [IM] session, a video conference, and so forth. In a Session Initiation Protocol (or "SIP") context, a call is a type of session.
  The term "calendrical time," and its inflected forms, is defined as being indicative of one or more of the following:
    i. a time (e.g., 16:23:58, etc.),
    ii. one or more temporal designations (e.g., Tuesday, November, etc.),
    iii. one or more events (e.g., Thanksgiving, John's birthday, etc.), and
    iv. a time span (e.g., 8:00 pm to 9:00 pm, etc.).

Figure 1:
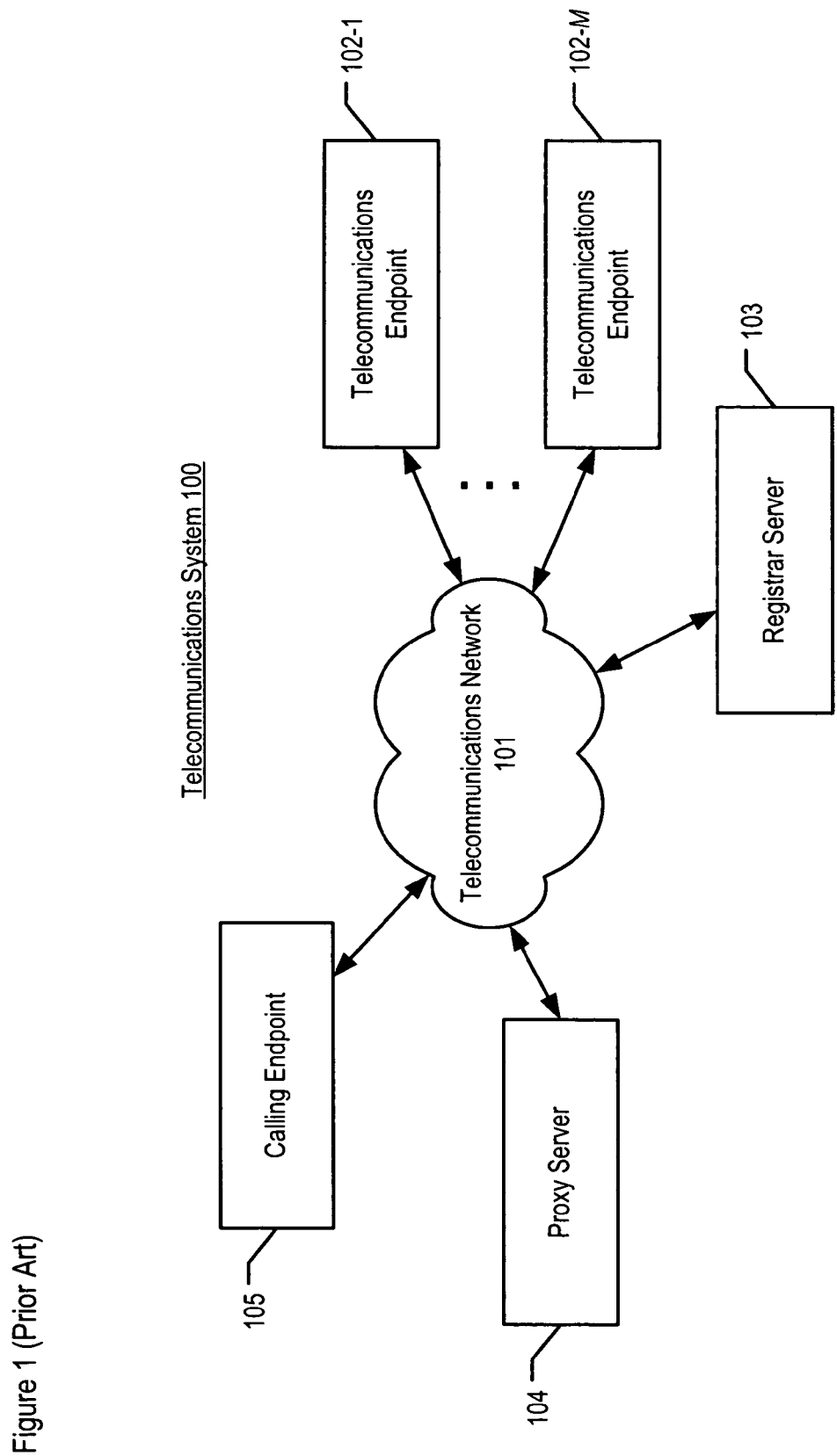
FIG. 1 depicts telecommunications system 100 in the prior art.
Figure 2:
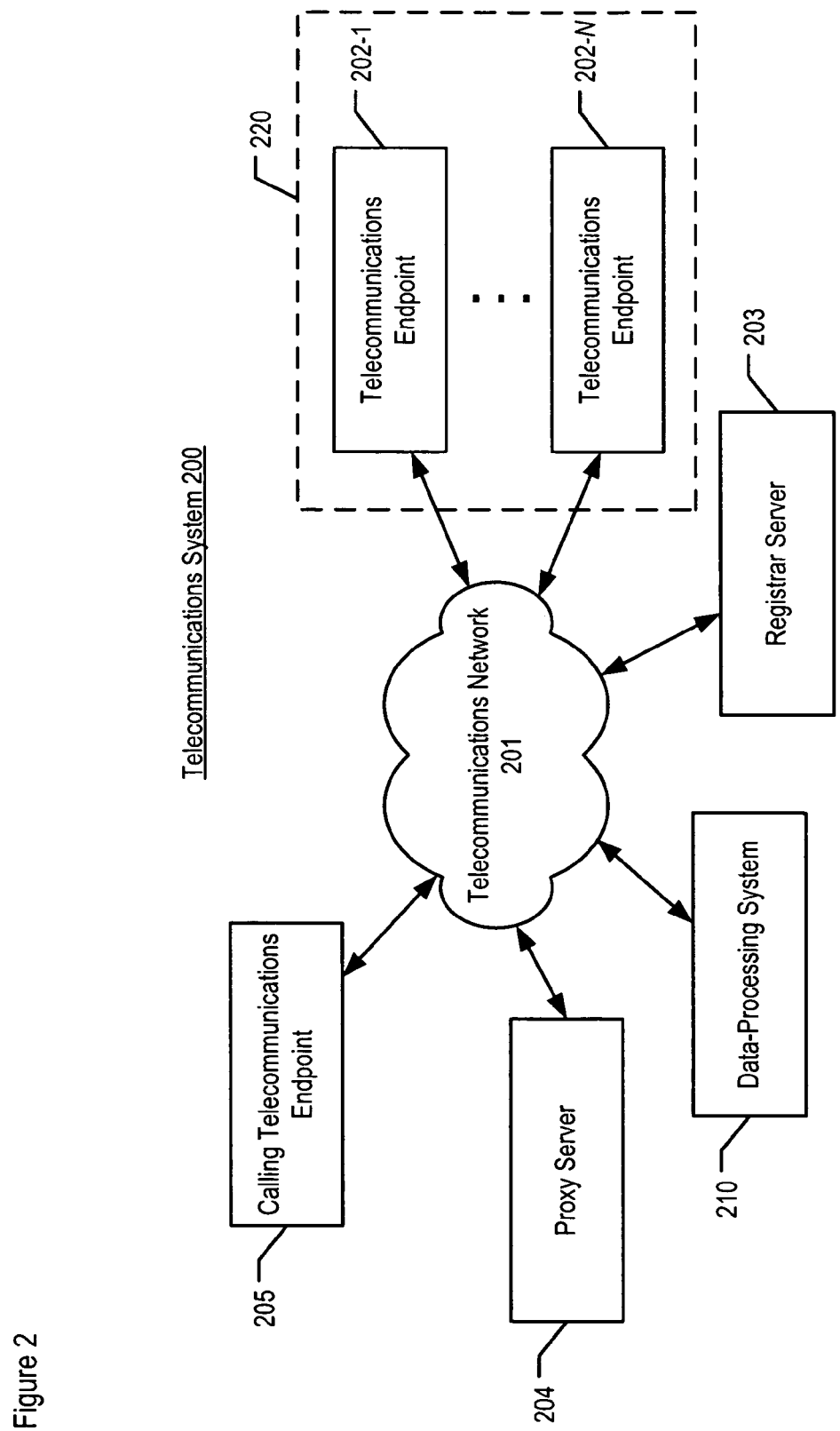
FIG. 2 depicts telecommunications system 200 that comprises data-processing system 210, in accordance with the illustrative embodiment of the present invention.

FIG. 2 depicts telecommunications system 200 in accordance with the illustrative embodiment of the present invention. Telecommunications system 200 comprises telecommunications network 201; telecommunications endpoints 202-1 through 202-N, wherein N is a positive integer; registrar server 203; proxy server 204; calling endpoint 205; and data-processing system 210, interconnected as shown. Telecommunications system 200 is capable of Session Initiation Protocol-based (SIP-based) signaling, in accordance with the illustrative embodiment. Nevertheless, it will be clear to those who are skilled in the art how to apply the present invention to some alternative embodiments that use other types of call-control signaling, such as H.323, as is known in the art.

Telecommunications network 201 is a telecommunications network such as the Internet, the Public Switched Telephone Network (PSTN), and so forth. Network 201 comprises or is connected to one or more transmission-related nodes such as gateways, routers, or switches that are used to direct packets from one or more sources to the correct destinations of those packets. Network 201 is capable of handling SIP-based messages in well-known fashion that are transmitted among two or more SIP-capable processing systems.

Each of telecommunications endpoints 202-1 through 202-N, as well as calling endpoint 205, is a SIP-capable device such as an Internet-protocol telephone, a notebook computer, a personal digital assistant (PDA), a tablet computer, and so forth. Each endpoint is capable of originating outgoing calls and receiving incoming calls, in well-known fashion. In addition, each endpoint is capable of one or more communication modes that comprise, but are not limited to voice, video, data, email, instant messaging, and chat.

Each telecommunications endpoint 202-$n$, for n=1 through N, is identified by a unique contact address, as is known in the art. Moreover, the contact addresses for endpoints 202-1 through 202-N are associated with a public address of a particular user, the association being depicted in FIG. 2 as endpoint group 220. For example, a user named Carol Q. Jones might have a public address of "cjones" and four endpoints that are identified by the following contact addresses:
  i. sip:cjones@111.111.111.111:5061;transport=tls;
  ii. sip:cqj@111.111.111.222:5061;transport=tls;
  iii. sip:19735551212@company.com; and
  iv. sip:carol@home.com.

In the example, each of Carol's four endpoints is considered to be a contact for the purpose of reaching her. When an endpoint is added to system 200, such as when the endpoint is plugged into a wall socket, the added endpoint (e.g., endpoint 202-4, etc.) registers its contact address with registrar server 203, which is described below. Subsequently, when Carol is called by another party, such as the user of calling endpoint 205, the public address that is used to specify the destination is "cjones." System 200 routes the incoming call to one or more of endpoints 202-1 through 202-N in well-known fashion. Note that the order in which the endpoints are involved with the incoming call is determined, in accordance with the illustrative embodiment, as described below and with respect to FIG. 4.

As intimated above, some or all of endpoints 202-1 through 202-N might belong to a specific human user. As those who are skilled in the art will appreciate, however, endpoints 202-1 through 202-N might belong to a user that is itself a telecommunications device, such as an automated call distributor (ACD). In this case, incoming calls have as their destination address the address of the ACD system, where the individual contact addresses correspond to the various endpoints in the ACD system.

It will be clear to those skilled in the art how to make and use telecommunications endpoints 202-1 through 202-N.

Registrar server 203 is a server that operates in accordance with the Session Initiation Protocol and that accepts registrations from endpoints 202-1 through 202-N, in well-known fashion. Registrar server 203 maintains a database of one or more public addresses (for the one or more users that are served by registrar server 203), along with one or more contact addresses that are associated with each public address. When telecommunications endpoint 202-$n$ registers its contact address and its association with a particular public address, the endpoint becomes a contact for a particular user. Registrar server 203 also maintains in its database one or more q-values, as are known in the art, which describe the levels of priority of the different contacts that are associated with a public address. For example, if the q-value of a first contact is higher than the q-value of a second contact, the first contact (i.e., endpoint) will be notified of an incoming call before the second contact. It will be clear to those who are skilled in the art how to make and use registrar server 203.

Proxy server 204 is a server that operates in accordance with the Session Initiation Protocol and that handles incoming calls (i.e., invitations to join a session) on behalf of each of the users in telecommunications system 200 to whom public addresses are assigned. Based on the q-values of the contacts for a particular public address, proxy server 204 will route the notification of an incoming call to one or more contacts, in well-known fashion. It will be clear to those skilled in the art how to make and use proxy server 204.

Data-processing system 210 is a server that operates in accordance with the Session Initiation Protocol and that is described in additional detail below and with respect to FIG. 3. System 210 is capable of prioritizing q-values by performing the tasks that are described with respect to FIG. 4, in accordance with the illustrative embodiment of the present invention. Although system 210 as depicted is a standalone device that is overlaid onto existing registrar server 203, in some alternative embodiments system 210 is embedded in server 203. It will be clear to those skilled in the art, after reading this specification, how to make and use data-processing system 210.

Figure 3:
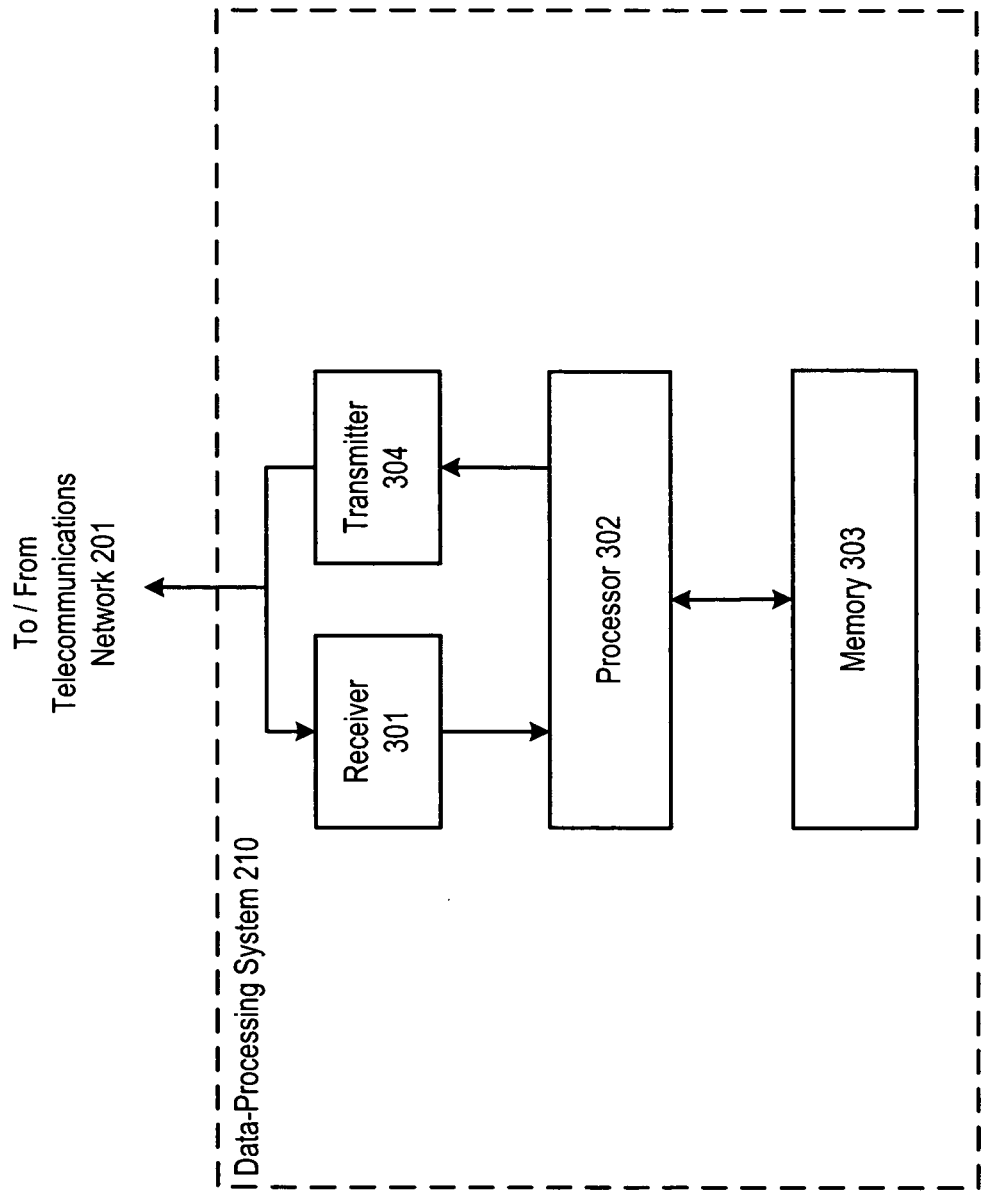
FIG. 3 depicts the salient components of data-processing system 210.

FIG. 3 depicts the salient components of data-processing system 210 in accordance with the illustrative embodiment of the present invention. System 210 comprises receiver 301, processor 302, memory 303, and transmitter 304, interconnected as shown.

Receiver 301 receives signals from other servers (e.g., registrar server 203, etc.) via network 201 and forwards the information encoded in the signals to processor 302, in well-known fashion. It will be clear to those skilled in the art, after reading this specification, how to make and use receiver 301.

Processor 302 is a general-purpose processor that is capable of receiving information from receiver 301, executing instructions stored in memory 303, reading data from and writing data into memory 303, executing the tasks described below and with respect to FIG. 4, and transmitting information to transmitter 304. In some alternative embodiments of the present invention, processor 302 might be a special-purpose processor. In either case, it will be clear to those skilled in the art, after reading this specification, how to make and use processor 302.

Memory 303 stores the instructions and data used by processor 302. Memory 303 might be any combination of dynamic random-access memory (RAM), flash memory, disk drive memory, and so forth. It will be clear to those skilled in the art, after reading this specification, how to make and use memory 303.

Transmitter 304 receives information from processor 302 and transmits signals that encode this information to other servers (e.g., registrar server 203, etc.) via network 201, in well-known fashion. It will be clear to those skilled in the art, after reading this specification, how to make and use transmitter 304.

Figure 4:
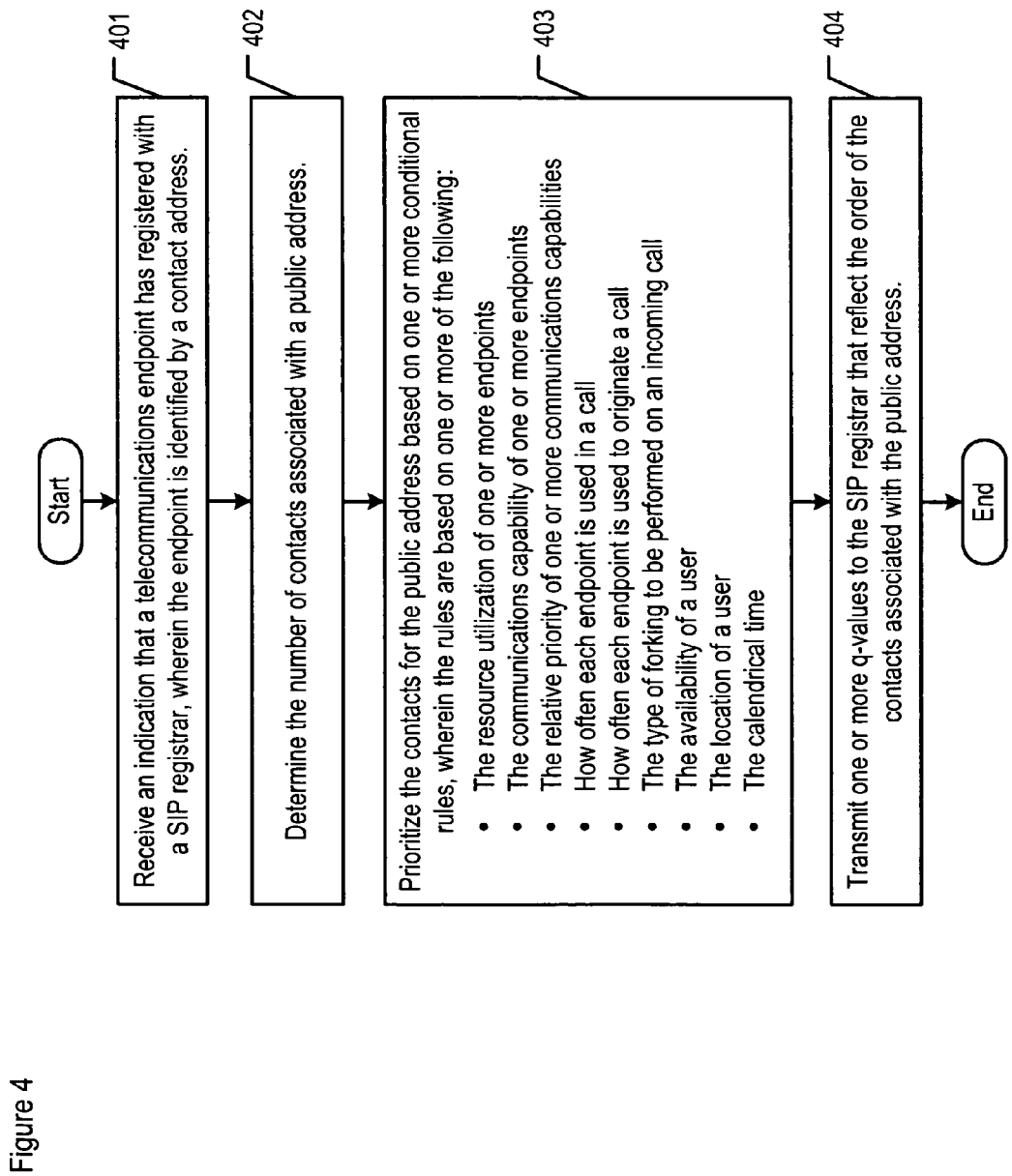
FIG. 4 depicts a flowchart of the salient tasks performed by data-processing system 210.

FIG. 4 depicts a flowchart of the salient tasks performed by data-processing system 210, in accordance with the illustrative embodiment of the present invention. As those who are skilled in the art will appreciate, some of the tasks that appear in FIG. 4 can be performed in parallel or in a different order than that depicted.

At task 401, data-processing system 210 receives an indication that a telecommunications endpoint has registered with registrar server 203 and that, as a result, a new contact with its own contact address (e.g., "carol@home.com," etc.) has become associated with a particular public address (e.g., "cjones," etc.). In some embodiments, registrar server 203 autonomously transmits the indication as a result of receiving a REGISTER message from the endpoint. In some other embodiments, registrar server 203 transmits the indication in response to receiving a query from system 210—in which case, system 210 transmits the query, either periodically or sporadically, as the result of one or more events having occurred. For example, system 210 might set a timer to send a query to registrar server 203 every ten minutes. Alternatively, system 210 might send a query when any endpoint that is associated with a particular public address exceeds a preset resource utilization level, such as 90% processor occupancy.

At task 402, data-processing system 210 determines the number of contacts that are associated with a public address. In accordance with the illustrative embodiment, system 210 stores and maintains the number of contacts, R, and updates R as system 210 receives additional information from registrar server 203, such as the registration indication that is described above and with respect to task 401. In some alternative embodiments, system 210 queries registrar server 203 for the exact number of contacts that are currently associated with a specified public address.

At task 403, data-processing system 210 prioritizes that contacts associated with a specific public address based on one or more conditional business rules, in accordance with the illustrative embodiment of the present invention. Those conditional rules are based on properties that comprise, but are not limited to, one or more of the following:

i. the calendrical time;
ii. the resource utilization (e.g., processor load, memory use, etc.) of one or more endpoints of the same public address;
iii. the communications capability of one or more endpoints of the same public address;
iv. a higher priority being assigned to voice-capable endpoints than to voice-incapable endpoints;
v. the frequency that each endpoint is used in calls, relative to the other endpoints of the same public address;
vi. the frequency that each endpoint is used specifically to originate a call, relative to the other endpoints of the same public address;
vii. the type of forking to be performed on an incoming call;
viii. the availability of a user; and
ix. the location of a user.

For example, the contacts that are endpoints 202-1 through 202-4 might be prioritized during normal working hours (i.e., 8:00 AM through 4:59 PM Monday through Friday) such that endpoint 202-1 is notified first, followed by endpoints 202-2, 202-3, and 202-4 sequentially in the order as written; however, during non-working hours (i.e., weekend hours and 5:00 PM through 7:59 AM Monday through Friday), data-processing system 210 re-prioritizes to have endpoint 202-3 notified first, followed by endpoints 202-1, 202-2, and 202-4 simultaneously. As those who are skilled in the art, the prioritizing can also be based on different conditional rules and on various combinations of two or more of those rules.

To prioritize the contacts, system 210 sets the q-value that corresponds to each contact to a SIP-compliant value. Valid q-values in the Session Initiation Protocol range from 0.000 to 1.000, with precision to the third decimal point. In the Session Initiation Protocol, the higher the q-value, the higher the priority of the contact. In some embodiments, a q-value of 1.000 is reserved in order to support immediately assigning the highest priority to one or more contacts without having to recalculate q-values for the other contacts of the same public address. In some embodiments, a q-value of 0.000 is reserved as the lowest priority, in order to support specific applications such as (i) a "do not disturb" feature, in which none of the contacts are notified of an incoming call, and (ii) a "do not route" feature, in which one or more contacts can be removed from service (similar to being "busied out")—for instance, to ensure that remote booting is performed on a telecommunications endpoint only when the endpoint is not in use.

In generating the q-values by using the number of registered contacts, R, which was determined at task 402. The number R provides the number of unique priority values that are possible for the particular set of contacts. System 210, in accordance with the illustrative embodiment, calculates the q-values by dividing R into the number of allocable q-values (i.e., the 999 possible values between 0.001 and 0.999, inclusive). For example, when there are four contacts, the generated values might be 0.995, 0.744, 0.496, and 0.248. In some alternative embodiments, system 210 calculates the q-values in a different way, such as by using consecutive values (i.e., 0.999, 0.998, 0.997, and so forth).

At task 404, data-processing system 210 transmits the q-values that reflect the updated ordering of the contacts to registrar server 203, in accordance with the illustrative embodiment. In accordance with the illustrative embodiment, the q-values are transmitted in one or more REGISTER messages because it is a message type that registrar server 203 already understands. In some alternative embodiments, system 210 transmits and stores the q-values into registrar server 203's database through other means, such as a new message. The new q-values replace the previous q-values in the database, which has the effect of re-ordering the contacts that are associated with a particular public address, compared with the original order that resulted from the endpoints having registered with their default q-values. For example, when registrar server 203 receives a request from proxy server 204 to provide priority information on the contacts in conjunction with an incoming call, server 203 provides the priority information that has been updated by system 210 in accordance with the illustrative embodiment.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
receiving at a data processing system, from a registrar server, a first indication that a first telecommunications endpoint has registered, wherein the first telecommunications endpoint is identified by a first contact address, and wherein the registrar server operates in accordance with the Session Initiation Protocol; and
transmitting from the data processing system, to the registrar server and in response to the receiving of the first indication, a first plurality of q-values that are based on at least one conditional rule having been evaluated in response to the receiving of the first indication;
wherein the first plurality of q-values determines the order in which the first telecommunications endpoint and a second telecommunications endpoint that is identified by a second contact address, receive notification of an incoming call with respect to each other; and
wherein the first contact address and the second contact address are associated with a public address.

2. The method of claim 1 wherein a first q-value had been provided by the first telecommunications endpoint when it registered with the registrar server.

3. The method of claim 1 further comprising:
receiving, from the registrar server, a second indication that a third telecommunications endpoint has registered, wherein the third telecommunications endpoint is identified by a third contact address; and
transmitting, to the registrar server and in response to the receiving of the second indication, a second plurality of q-values
wherein the second plurality of q-values determines the order in which the first telecommunications endpoint, the second telecommunications endpoint, and the third telecommunications endpoint, receive notification of the incoming call with respect to each other; and
wherein the third contact address is also associated with the public address.

4. The method of claim 3 wherein the conditional rule is also based on the communications capability of one or more telecommunications endpoints that are identified by the contact addresses associated with the public address.

5. The method of claim 3 wherein the conditional rule is also based on how often each contact address that is associated with the public address is used as the originating address of a call.

6. The method of claim 1 wherein the conditional rule also is based on the calendrical time.

7. The method of claim 1 wherein the registrar server transmits the indication that a first endpoint has registered in response to receiving a registration message from the first endpoint.

8. The method of claim 1 wherein the conditional rule is also such that a voice communications capability results in a higher-ranked q-value than does a non-voice communications capability.

9. The method of claim 1 wherein the conditional rule is also based on how often each contact address that is associated with the public address is involved in calls.

10. The method of claim 1 wherein the conditional rule is also based on whether one or more telecommunications endpoints are to be taken out of service.

11. The method of claim 1 wherein the conditional rule is also based on the type of forking to be performed on the incoming call to the public address.

12. The method of claim 1 wherein the conditional rule is also based on the availability of a user to whom the public address is assigned.

13. The method of claim 1 wherein the conditional rule is also based on the location of the user.

14. The method of claim 1 wherein the conditional rule is also based on the resource utilization of one of the first endpoint and the second endpoint.

15. A method comprising:
   receiving a priority setting request for a plurality of endpoints at a data processing system;
   determining the priority of the plurality of endpoints based on at least one conditional rule that is based on utilization of a hardware component of an endpoint from the plurality, wherein the priority of the plurality of endpoints determines the order in which multiple telecommunications endpoints, with respect to one another, receive notification of an incoming call to a public address associated with each of the telecommunications endpoints; and
   transmitting, from the data processing system, an indication of the priority of a contact associated with a telecommunications endpoint to a Session Initiation Protocol (SIP) registrar server, wherein
   the registrar server is managing the public address,
   the registrar server operates in accordance with the Session Initiation Protocol, and
   the indication of the priority is transmitted inside a Session Initiation Protocol (SIP) REGISTER message.

16. The method of claim 15 further comprising transmitting a first plurality of q-values to the registrar server, wherein the first plurality of q-values reflects the prioritized order of the plurality of endpoints.

17. The method of claim 15 wherein the hardware component is one of processor and memory.

18. The method of claim 15 wherein the request to determine the priority is transmitted by a Session Initiation Protocol (SIP) proxy server in response to an incoming call.

* * * * *